(12) United States Patent
Lanze et al.

(10) Patent No.: US 6,710,152 B1
(45) Date of Patent: Mar. 23, 2004

(54) SOLID PARTICLES

(75) Inventors: Rolf Lanze, Krefeld (DE); Michael Prein, Brasschaat (BE); Uwe Hucks, Alpen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/129,151

(22) PCT Filed: Oct. 24, 2000

(86) PCT No.: PCT/EP00/10470

§ 371 (c)(1),
(2), (4) Date: May 2, 2002

(87) PCT Pub. No.: WO01/32748

PCT Pub. Date: May 10, 2001

(30) Foreign Application Priority Data

Nov. 5, 1999 (DE) .......................................... 199 53 301

(51) Int. Cl.[7] .............................................. C08G 64/00
(52) U.S. Cl. ....................... 528/196; 525/461; 525/462; 525/463; 528/198; 528/199
(58) Field of Search ................................. 528/196, 198, 528/199; 525/462, 461, 463

(56) References Cited

U.S. PATENT DOCUMENTS

| | | | | |
|---|---|---|---|---|
| 4,469,838 A | * | 9/1984 | Liu et al. ..................... | 524/394 |
| 5,532,324 A | * | 7/1996 | Sakashita et al. ............ | 525/462 |
| 5,589,564 A | | 12/1996 | Komiya et al. .............. | 528/196 |
| 5,596,067 A | | 1/1997 | Komiya et al. .............. | 528/196 |
| 6,350,847 B1 | * | 2/2002 | Kuze et al. .................. | 528/196 |

FOREIGN PATENT DOCUMENTS

| | | |
|---|---|---|
| DE | 24 39 552 | 2/1976 |
| EP | 0 861 863 | 9/1998 |
| JP | 6-107581 | 4/1994 |

\* cited by examiner

*Primary Examiner*—Terressa Boykin
(74) *Attorney, Agent, or Firm*—Joseph C. Gil; Aron Preis

(57) ABSTRACT

Solid particles containing 10 to 90 parts by weight of a dihydroxy compound and 10 to 90 parts by weight of a carbonic acid ester are disclosed. Also disclosed is a process for the production of these particles, an apparatus suitable for the process and a method for their use in production of polycarbonate by transesterification of carbonic acid esters with dihydroxy compounds.

9 Claims, 1 Drawing Sheet

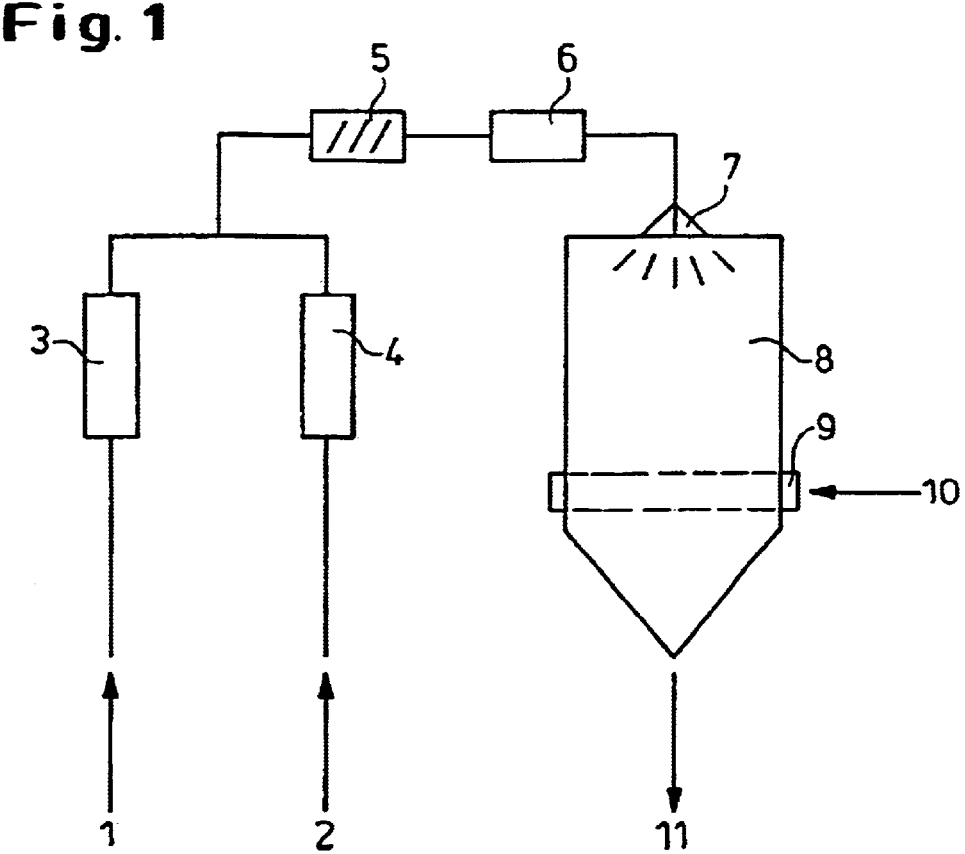

SOLID PARTICLES

The present invention relates to solid particles which contain dihydroxy compounds and carbonic acid esters and to a process for the production thereof and to an apparatus for the production thereof and to the use thereof for the production of polycarbonate using the transesterification process and to a process for the production of polycarbonate using the transesterification process.

It is known to produce polycarbonate by transesterifying carbonic acid esters with dihydroxy compounds. The process is described, for example, in the monograph by H. Schnell, *Chemistry& Physics of Polycarbonate, Polymer Reviews*, volume 9, John Wiley & Sons, 1964, pp. 44–51. The process is also described in *Encyclopedia of Polymer Science*, volume 10, 1969.

The process for the production of polycarbonate by transesterification is in particular suitable for producing the bisphenol A homopolycarbonate. To this end, bisphenol A is transesterified with carbonic acid esters, preferably diphenyl carbonate. The process for the production of polycarbonate by transesterification is also suitable for producing copolycarbonates based on bisphenol A and further dihydroxy compounds as copolymerisation partners. To this end, bisphenol A and the further dihydroxy compounds are transesterified with carbonic acid esters, preferably diphenyl carbonate.

When producing polycarbonate by transesterification, the reactants (dihydroxy compounds and carbonic acid esters and optionally further auxiliary substances and additives, such as for example branching agents) are reacted in a multistage reaction, preferably as a melt, preferably with the addition of a transesterification catalyst or a combination of two or more transesterification catalysts with elimination of a hydroxy compound from the carbonic acid ester. If diphenyl carbonate is used as the carbonic acid ester, the hydroxy compound eliminated is phenol. The equilibrium of the reaction is steadily displaced by varying the temperature and pressure above the reaction mixture. In this manner, light-coloured, solvent-free polycarbonates may be obtained by continued condensation Numerous catalysts, embodiments of the process and of the apparatus used have been described for the transesterification process for the production of polycarbonates.

The transesterification process for the production of polycarbonates has the advantage that neither solvents nor phosgene are required, as is the case with the "phase interface process" for the production of polycarbonates. The transesterification process for the production of polycarbonates thus allows polycarbonate to be produced in an economical and environmentally friendly manner, which polycarbonate additionally has the advantage that it contains no chlorine.

The process for the production of polycarbonate by transesterification generally places stringent requirements upon the purity of the starting materials and of the auxiliary substances used. Even the particular presentation of the starting materials and the auxiliary substances may have an influence upon the process and the quality of the polycarbonate produced.

The raw materials, dihydroxy compounds and carbonic acid esters used in the process for the production of polycarbonates by transesterification are, for example, introduced into the process as separate components and mixed, for example, during melting of the components. They may also both be introduced into the process as melts, such that the melts are mixed before the reaction. Such processes are described, for example, in EP-A 0 861 863.

A melt of a dihydroxy compound may be cooled to produce granules, flakes or prills in order to facilitate packaging, transport and storage, wherein prills exhibit advantages over granules or flakes due to their lower dust content and better flow characteristics.

It is known to produce solid particles, for example "prills", which contain only one material for the production of polycarbonates by the transesterification process, for example bisphenol A.

Prills of dihydroxy compounds, in particular bisphenol A prills, may for example be produced by introducing molten dihydroxy compounds, in particular molten bisphenol A, into the top of a prilling tower via a spray head having a plurality of nozzles, into which prilling tower is introduced a countercurrently recirculated stream of cooling gas, wherein the prills which have cooled approximately to room temperature are collected at and discharged from the bottom of the prilling tower.

JP-6-107 581 discloses a process for the production of bisphenol A prills in which molten bisphenol A is introduced into the top zone of a prilling tower and cooling gas is introduced countercurrently at the bottom of the prilling tower, which gas draws the heat of fusion from the falling droplets of melt. The solidified prills are discharged from the bottom of the prilling tower.

Separate storage and separate transport of the two raw materials, dihydroxy compound and carbonic acid ester, for the process for the production of polycarbonate by transesterification entail significant logistical costs. Separate introduction of the two raw materials into the process for the production of polycarbonate by transesterification is likewise associated with elevated plant and equipment costs.

The object underlying the present invention was accordingly to provide a process for the production of polycarbonate by transesterification of dihydroxy compounds and carbonic acid esters, which process does not exhibit the disadvantages arising from the use of the two separate raw materials, dihydroxy compounds and carbonic acid esters, of the processes known from the prior art.

Said object of the invention is achieved by a process for the production of polycarbonate by transesterification of dihydroxy compounds and carbonic acid esters, wherein the dihydroxy compounds and the carbonic acid esters are introduced into the process in the form of solid particles which contain both dihydroxy compounds and carbonic acid esters.

The present invention accordingly provides a process for the production of polycarbonate by transesterifying carbonic acid esters with dihydroxy compounds, characterised in that the raw material used comprises solid particles which contain 10 to 90 parts by weight of a dihydroxy compound and 10 to 90 parts by weight of a carbonic acid ester.

It is possible in this process that further raw materials, other than the stated solid particles, are used for the process according to the invention. These may also comprise further dihydroxy compounds and/or carbonic acid esters. It is preferred to introduce the entire quantity of carbonic acid ester and dihydroxy compound required as starting material in the form of the solid particles according to the invention.

The present invention furthermore provides the use of solid particles which contain 10 to 90 parts by weight of a dihydroxy compound and 10 to 90 parts by weight of a carbonic acid ester for the production of polycarbonate by transesterification of carbonic acid esters with dihydroxy compounds.

The present invention furthermore provides solid particles, characterised in that they contain 10 to 90 parts by weight of a dihydroxy compound and 10 to 90 parts by weight of a carbonic acid ester.

The present invention furthermore provides a process for the production of solid particles, characterised in that a melt which contains 10 to 90 parts by weight of the dihydroxy compound and 10 to 90 parts by weight of the carbonic acid ester is cooled.

The present invention furthermore provides an apparatus for the production of solid particles which contain 10 to 90 parts by weight of a dihydroxy compound and 10 to 90 parts by weight of a carbonic acid ester, characterised in that the apparatus has two separate feed lines for the melt of the carbonic acid ester and for the melt of the dihydroxy compound and that these feed lines open into two separate heat exchangers and that the lines to convey the carbonic acid ester and the dihydroxy compound away from their particular heat exchangers are joined to combine the two streams of material and that, in the line which conveys onwards the combined streams of material comprising carbonic acid ester and dihydroxy compound, the apparatus has a mixing element and, thereafter, a heat exchanger and that the apparatus comprises a prilling tower which is fed with the combined stream of material comprising carbonic acid ester and dihydroxy compound originating from the last-stated heat exchanger.

The process according to the invention for the production of polycarbonate by transesterification has numerous advantages. It simplifies raw materials logistics, in particular simplifying storage and transport of the raw materials. Introduction of the raw materials into the process is simplified The process according to the invention for the production of polycarbonate by transesterification using the solid particles according to the invention as the raw material is distinguished by logistical advantages, such as for example simple storage of the raw materials, simple transport of the raw materials and simple introduction of the raw materials into the process.

The process according to the invention for the production of polycarbonate by transesterification using the solid particles according to the invention as the raw material is furthermore distinguished by the advantage that the precise stoichiometric ratio between the carbonic acid ester and dihydroxy compound may be established in the prill. This furthermore has the advantage that complex apparatuses for mixing the melts or solids consisting of the dihydroxy compound and carbonic acid ester are not required in the process for the production of the polycarbonate.

The solid particles of dihydroxy compounds and carbonic acid esters according to the invention have numerous advantages. They are mechanically stable. They may be stored without reacting chemically or discolouring. The solid particles according to the invention are distinguished by elevated colour stability and long storage life as well as by elevated purity.

The process according to the invention for the production of solid particles which contain carbonic acid esters and dihydroxy compounds has numerous advantages. It provides mechanically stable, storable and light-coloured solid particles of the stated composition in a simple manner. In comparison with separate preparation of the carbonic acid ester and the dihydroxy compound, less plant and equipment is required, for example one prilling tower instead of two prilling towers.

The apparatus according to the invention for the production of solid particles which contain carbonic acid esters and dihydroxy compounds has numerous advantages.

For example, the apparatus according to the invention ensures that the streams comprising the carbonic acid ester melt and the melt of the dihydroxy compound are not combined until they have been cooled to a temperature just above the particular melting point thereof. This means that the two melts are combined at the lowest possible temperature, which in turn means that unwanted secondary reactions do not occur. The apparatus according to the invention furthermore ensures that the melt streams combined in this manner are thoroughly mixed immediately after they have been combined and are cooled in another heat exchanger to a temperature just above the melting point of the mixture. Prill production and thus cooling then proceed immediately thereafter. The apparatus according to the invention thus ensures the shortest possible residence time of the combined melts at the lowest possible temperatures, so reducing unwanted secondary reactions to a minimum.

The solid particles according to the invention may be of any desired size and shape. They are preferably of a spherical or virtually spherical shape ("prills"). They may, however, assume the form of powder particles, flakes or pellets.

The process according to the invention for the production of solid particles containing dihydroxy compounds and carbonic acid esters is characterised in that a melt, which contains dihydroxy compounds and carbonic acid esters, is cooled and consequently solidified. This process is preferably performed by "prilling", i.e. the melt is dispersed in the gas phase, for example in the form of spherical melt particles, which then cool in free fill in the gas phase and solidify. Solidification preferably means crystallisation. It may, however, also mean in general crystallisation or glassy solidification which results in the solid particles' having an amorphous state.

The stated, preferred embodiment according to the invention of the process for the production of solid particles by the prilling process has the advantage that the prilling process permits a short residence time of the combined streams of dihydroxy compound and carbonic acid ester as a melt. This is ensured by its being possible to achieve rapid cooling and solidification of the combined melts of carbonic acid ester and dihydroxy compound in the prilling process. This results in the advantage that the individual components, carbonic acid esters and dihydroxy compounds, do not react with each other in the melt, such that no unwanted secondary products are obtained. The stated advantage distinguishes the prilling process from other processes for solidifying the melt, for example processes for producing granules or flakes.

It is accordingly a particularly preferred embodiment of the process according to the invention for the production of solid particles if the process is performed as a prilling process and if the process has only short residence time of the combined melts of dihydroxy compound and carbonic acid ester and if the combined melt of carbonic acid ester and dihydroxy compound has a temperature which is only slightly above the solidification point of this melt.

The residence time of the combined melts of dihydroxy compound and carbonic acid ester is preferably less than 60 seconds, particularly preferably less than 30 seconds and very particularly preferably less than 10 seconds. The temperature of the combined melts of carbonic acid ester and dihydroxy compound is preferably less than 20° C. above the solidification point of this melt, particularly preferably less than 5° C. above the solidification point and very particularly preferably less than 1° C. above the solidification of this melt.

One particularly preferred embodiment of the process according to the invention is accordingly to prepare the separate melts of dihydroxy compound and carbonic acid ester each separately at a temperature just above the melting point thereof, then to mix them, then to cool them to a temperature just above the solidification point of the mixed melt and then to solidify them in a prilling process, wherein the entire process is performed such that the residence time of the combined melt of carbonic acid ester and dihydroxy compound in the liquid phase, i.e. until solidification by prilling, is kept as short as possible.

Another preferred embodiment of the process according to the invention for the production of the solid particles is to solidify the melt which contains dihydroxy compounds and carbonic acid esters using known processes to yield granules or flakes.

Another preferred embodiment of the process according to the invention for the production of the solid particles is to pelletise a melt which contains dihydroxy compounds and carbonic acid esters using known pelletising processes.

Dihydroxy compounds for the purposes of the present invention are any desired dihydroxy compounds which are suitable for the production of polycarbonates.

The following are examples of suitable dihydroxy compounds:

4,4'-dihydroxydiphenyl,
2,4-bis(4hydroxyphenyl)-2-methylbutane,
1,1-bis(4-hydroxyphenyl)ryclohexane,
α,α-bis(4hydroxyphenyl)-p-diisopropylbenzene,
α,α-bis(4-hydroxyphenyl)-m-diisopropylbezene,
2,2-bis(3-methyl-4-hydroxyphenyl)propane,
2,2-bis(3-chloro-4-hydroxyphenyl)propane,
bis(3,5-dimethyl-4-hydroxyphenyl)methane,
2,2-bis(3,5-dimethyl-hydroxyphenyl)propane,
bis(3,5-dimethyl-4-hydroxyphenyl) sulfone,
2,4-bis(3,5-dimethyl-4-hydroxyphenyl)-2-methylbutane,
1,1-bis(3,5-dimethyl-4-hydroxyphenyl)cyclohexane,
α,α-bis(3,5-dimethyl-4-hydroxyphenyl)-p-diisopropylbenzene,
1,1-bis(4-hydroxyphenyl)-3,3,5-trimethylcyclohexane,
1,1-bis(4-hydroxyphenyl)-3-methylcyclohexane,
1,1-bis(4-hydroxyphenyl)-3,3,-methylcyclohexane,
1,1-bis(4-hydroxyphenyl)-4-methylcyclohexane,
2,2-bis(3,5-dichloro-4-hydroxyphenyl)propane,
2,2-bis(3,5-dibromo-4-hydroxyphenyl)propane,
1,1-bis(4-hydroxyphenyl)-1-phenylethane,
2,2-bis(3,5-dimethyl-4-hydroxyphenyl)-2-phenylethane,
2,2-bis(4-hydroxyphenyl)-2,2-diphenylethane,
9,9-bis(4-hydroxyphenyl)fluorene,
9,9-bis(3,5-dimethyl-4-hydroxyphenyl)fluorene.

The following are particularly preferred dihydroxy compounds:

2,2-bis(3,5-dimethyl-4-hydroxyphenyl)propane,
1,1-bis(4-hydroxyphenyl)cyclohexane,
1-bis(4-hydroxyphenyl)-1-phenylethane,
1,1-bis(4hydroxyphenyl)-3,3,5-trimethylcyclohexane,
1,1-bis(4-hydroxyphenyl)-3-methylcyclohexane,
1,1-bis(4-hydroxyphenyl)-4-methylcyclohexane,
9,9-bis(3,5-dimethyl-4-hydroxyphenyl)fluorene.

2,2-Bis(4-hydroxyphenyl)propane (also known as bisphenol A) is the dihydroxy compound which is particularly preferred according to the invention.

According to the invention, any desired carbonic acid esters may be used. Diphenyl carbonate is preferred.

The solid particles according to the invention contain 10 to 90 parts by weight of a dihydroxy compound and 10 to 90 parts by weight of a carbonic acid ester. The solid particles according to the invention preferably contain 30 to 80 parts by weight of a dihydroxy compound and 20 to 70 parts by weight of a carbonic acid ester. The solid particles according to the invention particularly preferably contain 0.9 to 1.2 mol of carbonic acid ester per mol of dihydroxy compound. The solid particles very particularly preferably consist of 1 mol of dihydroxy compound and 1 mol of carbonic acid ester without containing any further substances. The person skilled in the art is, of course, aware that, as in the past, the solid particles may contain small quantities of impurities. The phrase "further substances" is thus not intended to mean such impurities, but merely that no appreciable quantity of any further substances is deliberately included in the solid particles, such substances possibly being, for example, regulators, fillers or any other desired substances. Among the above-stated solid particles, those which are most preferred are those in which the hydroxy compound is bisphenol A and the carbonic acid ester is diphenyl carbonate.

The process for the production of polycarbonate by transesterifying dihydroxy compounds and carbonic acid ester is performed in accordance with known methods, wherein, in contrast with the prior art, the solid particles according to the invention which contain dihydroxy compounds and carbonic acid esters are used as the raw material. Preferably, the entire required quantity of dihydroxy compounds and carbonic acid esters is used in the form of the solid particles according to the invention. It is, however, also possible to introduce dihydroxy compounds and/or carbonic acid esters in another form, for example as a melt or as a solution or as a solid, into the process in addition to the solid particles according to the invention.

Polycarbonates according to the invention which are produced using the process according to the invention for the production of polycarbonate by transesterification are both homopolycarbonates and copolycarbonates.

Preferred polycarbonates are bisphenol A homopolycarbonate and copolycarbonates which contain bisphenol, A and 1,1-bis(4-hydroxyphenyl)-3,3,5-trimethylcyclohexane as the dihydroxy components.

Bisphenol A homopolycarbonate is particularly preferred.

The apparatus according to the invention is illustrated in greater detail below by means of a drawing (FIG. 1) showing a preferred exemplary embodiment.

FIG. 1 shows an apparatus which has two separate feed lines 1 and 2 for the separate melt streams of carbonic acid ester and dihydroxy compound. The feed lines each lead into the heat exchangers 3 and 4, in which the separate melts are cooled to just above the respective solidification points thereof. The combined melt streams are then passed through a mixer 5 and cooled in a heat exchanger 6 to a temperature just above the solidification point of the combined melt stream of carbonic acid ester and dihydroxy compound. This melt is then introduced via a spray head 7 into a prilling tower 8 in the form of liquid drops, wherein nitrogen 10 flows countercurrently to these drops, which nitrogen is introduced into the bottom is of the prilling tower via an annular nozzle 9. The solid prills of carbonic acid ester and dihydroxy compound 11 are drawn off from the bottom of the prilling tower.

EXAMPLES

Example 1

The following Examples show that, with regard to the use of mixed prills of dihydroxy compounds, in particular bisphenol A (BPA) and carbonic acid esters, in particular diphenyl carbonate (DPC), as a raw material in the process for the production of polycarbonate by transesterification, it is possible to produce mixed prills of dihydroxy compounds, in particular bisphenol A (BPA) and carbonic acid esters, in particular diphenyl carbonate (DPC), and whether storage of such prills over an extended period is possible without increased elimination of a hydroxy compound, in particular phenol.

To this end, a 50:50 wt. % mixture of DPC and BPA was homogenised by melting at 140° C. under an inert gas atmosphere. Prills were then obtained under laboratory conditions by dropwise addition of the melt into liquid nitrogen and slow warming to room temperature. These prills had a diameter of approx. 1 mm with an approximately spherical shape, were pourable and no surface tack was observed.

The test was performed both without addition of a catalyst (sample A) and in the presence of 500 ppb of sodium phenolate (addition immediately before dropwise addition into liquid nitrogen, sample B). The composition of the resultant prills was determined by HPLC immediately after production and after 2 and 4 weeks' storage at room temperature under an air atmosphere. The solidified 50:50 melt from sample A (unprilled, blank sample) was used as a comparison sample.

Table 1 summarises the results. In addition to BPA and DPC, small quantities of phenol and corresponding quantities of low condensation products y1, x1 and n1 were found in all the samples. Within the accuracy of measurement, the sample A prills exhibited the same homogeneity (BPA:DPC ratio) and composition as the blank sample. No fighter reaction during storage was observed, condensation thus having occurred during the melting operation. In the presence of 0.5 ppm of sodium phenolate, increased condensation was observable immediately after prilling and stabilised to approx. 3% conversion after 2 weeks' storage. There was no detectable formation of yellow components in any of the samples after 4 weeks' storage.

TABLE 1

Composition of the BPA/DPC samples
(All values in wt. %, optimised for detection of secondary components.
0.18% of o,p-BPA was additionally detected in each case.)

| Sample | Time | BPA | DPC | Phenol | Compound y1 | Compound x1 | Compound n1 |
|---|---|---|---|---|---|---|---|
| Blank | immediate | 49.5 | 49.6 | 0.4 | 0.6 | <0.01 | 0.01 |
| Blank | 14 d | 49.7 | 49.7 | 0.3 | 0.6 | <0.01 | 0.02 |
| Blank | 28 d | 49.7 | 49.3 | 0.3 | 0.6 | <0.01 | 0.02 |
| Sample A | immediate | 49.7 | 49.9 | 0.2 | 0.8 | <0.01 | 0.02 |
| Sample A | 14 d | 49.5 | 49.8 | 0.3 | 0.8 | <0.01 | 0.03 |
| Sample A | 28 d | 49.6 | 49.2 | 0.3 | 0.7 | <0.01 | 0.03 |
| Sample B | immediate | 48.3 | 48.4 | 0.8 | 2.8 | 0.10 | 0.12 |
| Sample B | 14 d | 46.8 | 47.1 | 1.3 | 5.1 | 0.12 | 0.13 |
| Sample B | 28 d | 46.9 | 46.8 | 1.4 | 5.5 | 0.12 | 0.14 |

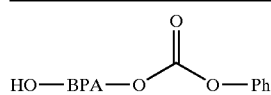

Compound y1

TABLE 1-continued

Composition of the BPA/DPC samples
(All values in wt. %, optimised for detection of secondary components.
0.18% of o,p-BPA was additionally detected in each case.)

| Sample | Time | BPA | DPC | Phenol | Compound y1 | Compound x1 | Compound n1 |
|---|---|---|---|---|---|---|---|

HO—BPA—O—C(=O)—O—BPA—OH

Compound x1

Ph—O—C(=O)—O—BPA—O—C(=O)—O—Ph

Compound n1

These Examples show that it is possible to produce mixed prills of BPA and DPC, that the rates of conversion in the quenched melts at room temper are very low in the absence of catalytically active compounds, that no colour formation is to be observed. It is favourable to keep the residence time of the melt before prilling as short as possible and to ensure strict exclusion of catalytic compounds.

Example 2

Production of Polycarbonate from DPC/BPA Mixed Prills

Methods used: Relative solution viscosity $\eta_{rel}$ was determined on a solution containing 5 g/l of polymer in dichloromethane at 25° C.

The yellowness index YI was measured to ASTM D 1925, transmission to ASTM D 1003.

A mixture of 22.6 g (53.0 mmol) of diphenyl carbonate and 22.8 g (50.0 mmol) of bisphenol A were homogenised by being fused at 140° C. under a nitrogen atmosphere. Approximately spherical prills (diameter approx. 1.0 mm) were then obtained by dropwise addition of the melt into liquid nitrogen and slowly raising the temperature to room temperature. The prills were pourable and no surface tack was observed even after 14 days' storage at room temperature.

35 g of the prills produced in this manner were placed in a 50 ml three-necked flask equipped with stirrer, internal thermometer and Vigreux column and distillation bridge. Atmospheric oxygen was removed from the apparatus by fivefold application of a vacuum and subsequent flushing with nitrogen (99.99%) and the mixture was heated to 150° C. Fusion of the BPA/DPC mixed prills was complete at this temperature. After addition of $4 \times 10^{-3}$ mol% of tetraphenylphosphonium phenolate relative to bisphenol A, the temperature was raised stepwise to 250° C. and the liberated phenol removed by distillation at 100 mbar. The vacuum was then enhanced stepwise to 1 mbar and the temperature increased to 260° C. The temperature was then increased to 300° C. and the mixture stirred for 1.5 hours at a vacuum of 0.1 mbar. The liberated phenol was condensed in the distillation bridge and remove& The entire test lasted 3.5 h from fusion of the mixed prills.

Light-coloured, solvent-fee polycarbonate exhibiting a relative solution viscosity $\eta_{rel}$ of 1.260 was obtained as the result of the reaction. The YI of the sample was determined at 2.3 and transmission at 88.31%. The range of properties of the polycarbonate produced in this manner could not be distinguished from that of polycarbonate which had been produced by introducing the raw materials DPC and BPA into the process as separate substances.

What is claimed is:

1. Solid particles, characterised in that they contain 10 to 90 parts by weight of a dihydroxy compound and 10 to 90 parts by weight of a carbonic acid ester.

2. Solid particles, characterised in that they contain 10 to 90 parts by weight of bisphenot A and 10 to 90 parts by weight of diphenyl carbonate.

3. Process for the production of solid particles according to claim 1, characterised in that a melt which contains 10 to 90 parts by weight of the dihydroxy compound and 10 to 90 parts by weight of the carbonic acid ester is cooled.

4. Process for the production of solid particles according to claim 2, characterised in that a melt which contains 10 to 90 parts by weight of bisphenol A and 10 to 90 parts by weight of diphenyl carbonate is cooled.

5. Apparatus for the production of the solid particles according to claim 1, characterised in that the apparatus has two separate feed lines for the melt of the carbonic acid ester (1) and for the melt of the dihydroxy compound (2) and that these feed lines open into two separate heat exchangers (3 and 4) and that the lines to convey the carbonic acid ester and the dihydroxy compound away from their particular heat exchangers are joined to combine the two streams of material, and that, in the line which conveys onwards the combined streams of material comprising carbonic acid ester and dihydroxy compound, the apparatus has a mixing element (5) and, thereafter, a heat exchanger (6) and that the apparatus comprises a prilling tower (8) which is fed with the combined stream of material comprising carbonic acid ester and dihydroxy compound originating from the last-stated heat exchanger.

6. A process for the production of solid particles comprising obtaining a melt that contains 10 to 90 parts by weight of the dihydroxy compound and 10 to 90 parts by weight of the carbonic acid ester and cooling the melt.

7. The process of claim 6 wherein the dihydroxy compound is bisphenol A and where carbonic acid ester is diphenyl carbonate.

8. A process for the production of solid particles comprising obtaining a melt which contains 10 to 90 parts by weight of bisphenol A and 10 to 90 parts by weight of diphenyl carbonate and cooling said melt characterized in that it is carried out in an apparatus having two separate feed lines for the melt of the carbonic acid ester and for the melt of the dihydroxy compound and that these feed lines open into two separate heat exchangers and that the lines to convey the carbonic acid ester and the dihydroxy compound away from their particular heat exchangers are joined to combine the two streams of material, and that, in the line which conveys onwards the combined streams of material comprising carbonic acid ester and dihydroxy compound, the apparatus has a mixing element and, thereafter, a heat exchanger and that the apparatus comprises a prilling tower which is fed with the combined stream of material comprising carbonic acid ester and dihydroxy compound originating from the last-stated heat exchanger.

9. A method of using the solid particles according to claim 1 comprising producing polycarbonate by transesterification of carbonic acid esters with dihydroxy compounds.

* * * * *